(12) United States Patent  
Tran

(10) Patent No.: US 6,278,396 B1  
(45) Date of Patent: Aug. 21, 2001

(54) MIDAIR COLLISION AND AVOIDANCE SYSTEM (MCAS)

(75) Inventor: My Tran, Albuquerque, NM (US)

(73) Assignee: L-3 Communications Corporation, Phoenix, AZ (US)

(*) Notice: Subject to any disclaimer, the term of this patent is extended or adjusted under 35 U.S.C. 154(b) by 0 days.

(21) Appl. No.: 09/708,214

(22) Filed: Nov. 8, 2000

Related U.S. Application Data

(63) Continuation of application No. 09/538,804, filed on Mar. 30, 2000.
(60) Provisional application No. 60/128,655, filed on Apr. 8, 1999.

(51) Int. Cl.$^7$ .................................................. G01S 13/93
(52) U.S. Cl. ................................ 342/29; 342/30; 342/36; 342/46; 342/49
(58) Field of Search ................................. 342/29, 30, 32, 342/36, 37, 38, 42, 43, 46, 49, 50, 57

(56) References Cited

U.S. PATENT DOCUMENTS

| | | | | |
|---|---|---|---|---|
| 5,459,469 | * | 10/1995 | Schuchman et al. | 342/37 |
| 5,548,839 | * | 8/1996 | Caldwell et al. | 455/313 |
| 5,570,095 | * | 10/1996 | Drouilhet et al. | 342/357.07 |
| 5,627,546 | * | 5/1997 | Crow | 342/352 |
| 5,691,723 | * | 11/1997 | Kin et al. | 341/178 |
| 5,798,726 | * | 8/1998 | Schuchman et al. | 342/37 |
| 5,835,059 | * | 11/1998 | Nadel et al. | 342/398 |
| 5,867,804 | * | 2/1999 | Pilley et al. | 701/120 |
| 5,929,783 | * | 7/1999 | King et al. | 340/870.05 |
| 6,006,158 | * | 12/1999 | Pilley et al. | 701/120 |
| 6,072,994 | * | 6/2000 | Phillips et al. | 455/84 |
| 6,169,770 | * | 1/2001 | Henely | 375/317 |
| 6,182,005 | * | 1/2001 | Pilley et al. | 701/120 |

FOREIGN PATENT DOCUMENTS

200022026 * 7/2000 (AU) .............................. G08G/5/04

* cited by examiner

Primary Examiner—John B. Sotomayor

(57) ABSTRACT

A midair collision avoidance system (MCAS) employs an existing design of Traffic Alert and Collision Avoidance System (TCAS) as a module and seamlessly integrates it with a customized tactical module which is capable of providing unique tactical avoidance guidance control and display. The tactical module handles all phases of a tactical mission, including formation flight (e.g., formation fall-in, arming formation flight, engaging formation flight following, and formation break-away), and an air-refueling sequence (e.g., rendezvous, link-up, re-fueling, and disengaging air-refueling). The tactical module divides the air space around the aircraft into advisory, caution, and warning zones and for each provides display, tone and voice alerts to facilitate pop-up avoidance guidance commands. Military aircraft can thus effectively avoid mid air and near mid air collision situations in all three different operation modes: air traffic control (ATC) management mode, tactical mode, and a mixed mode.

17 Claims, 17 Drawing Sheets

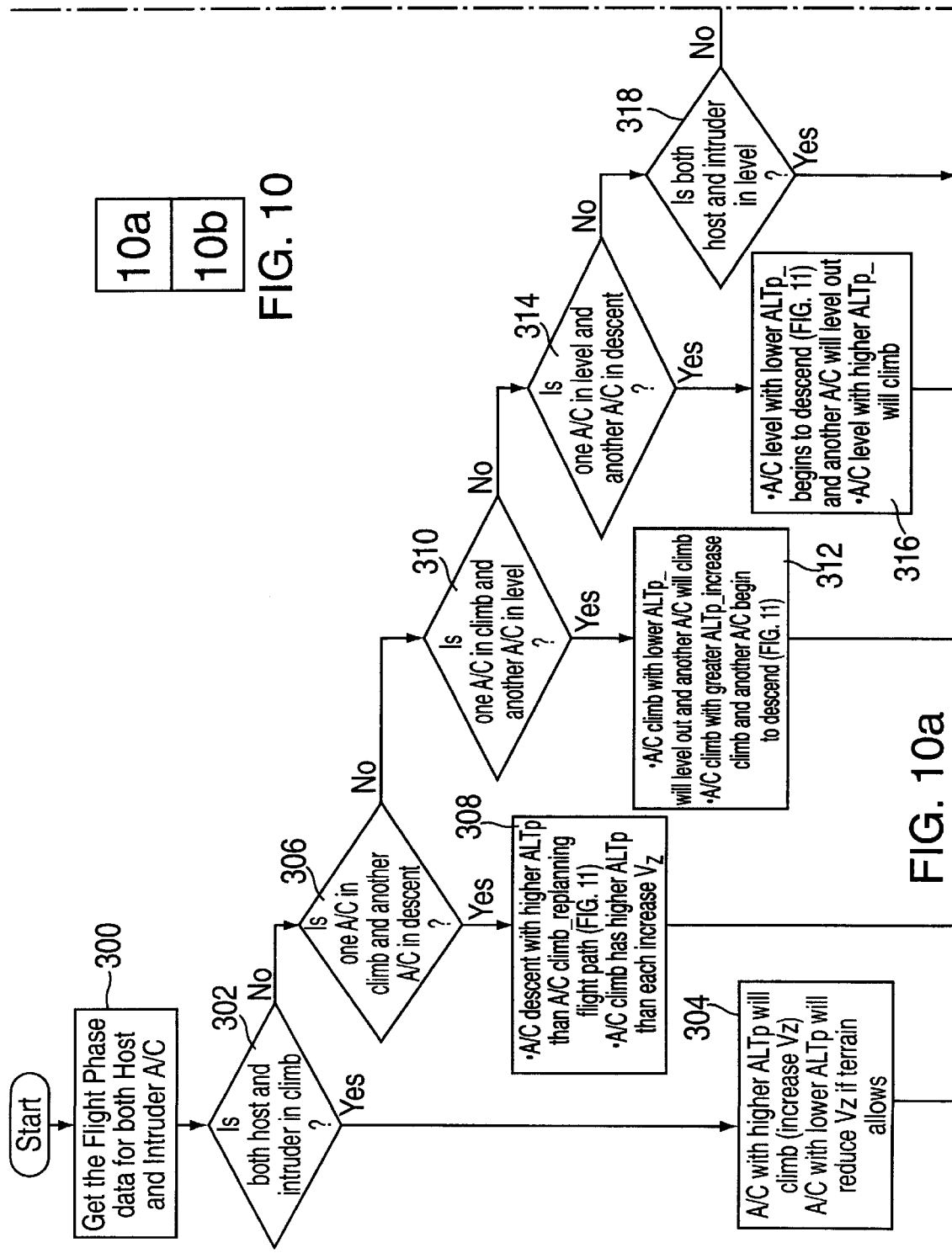

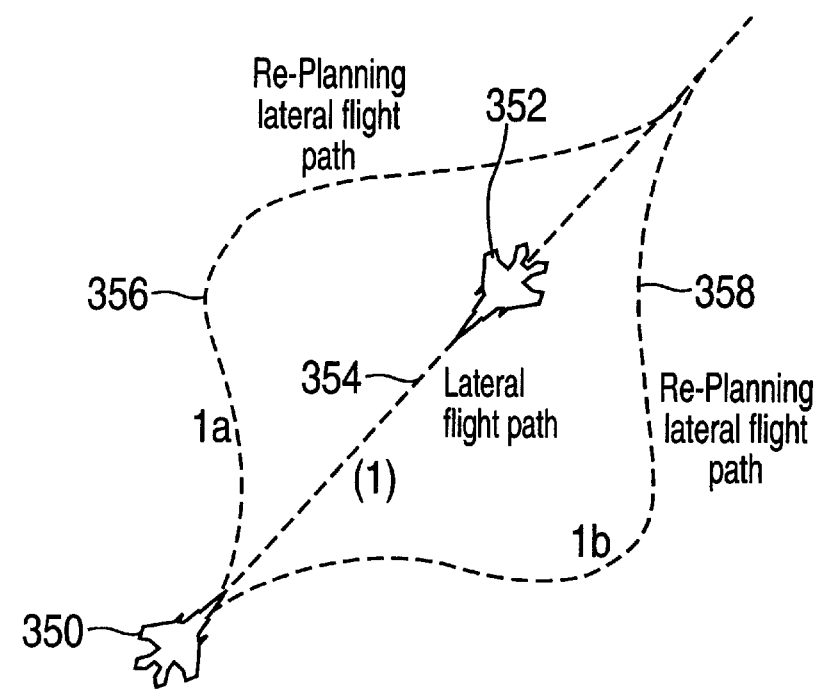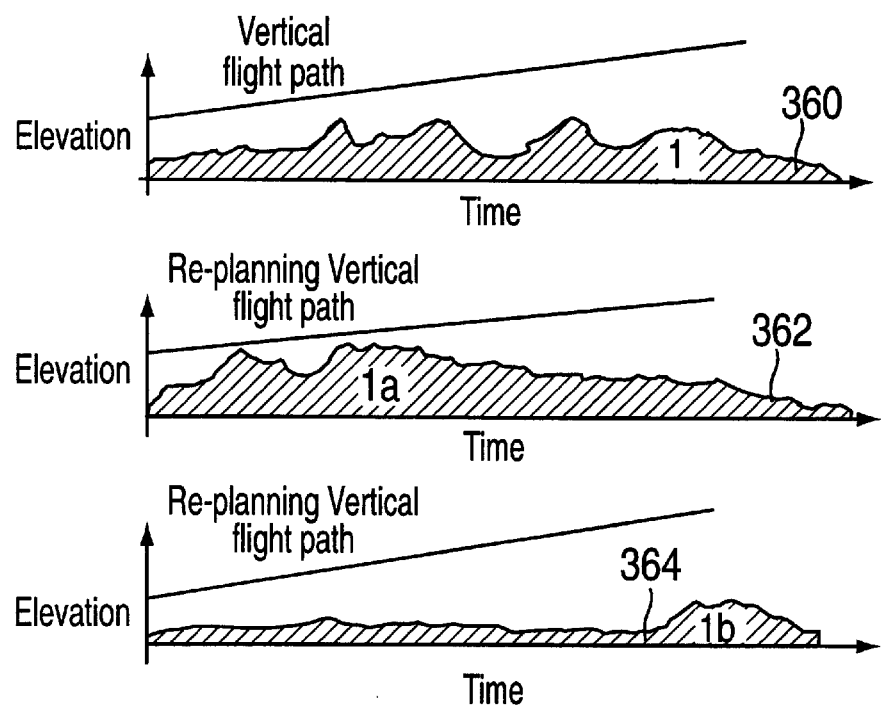
FIG. 11

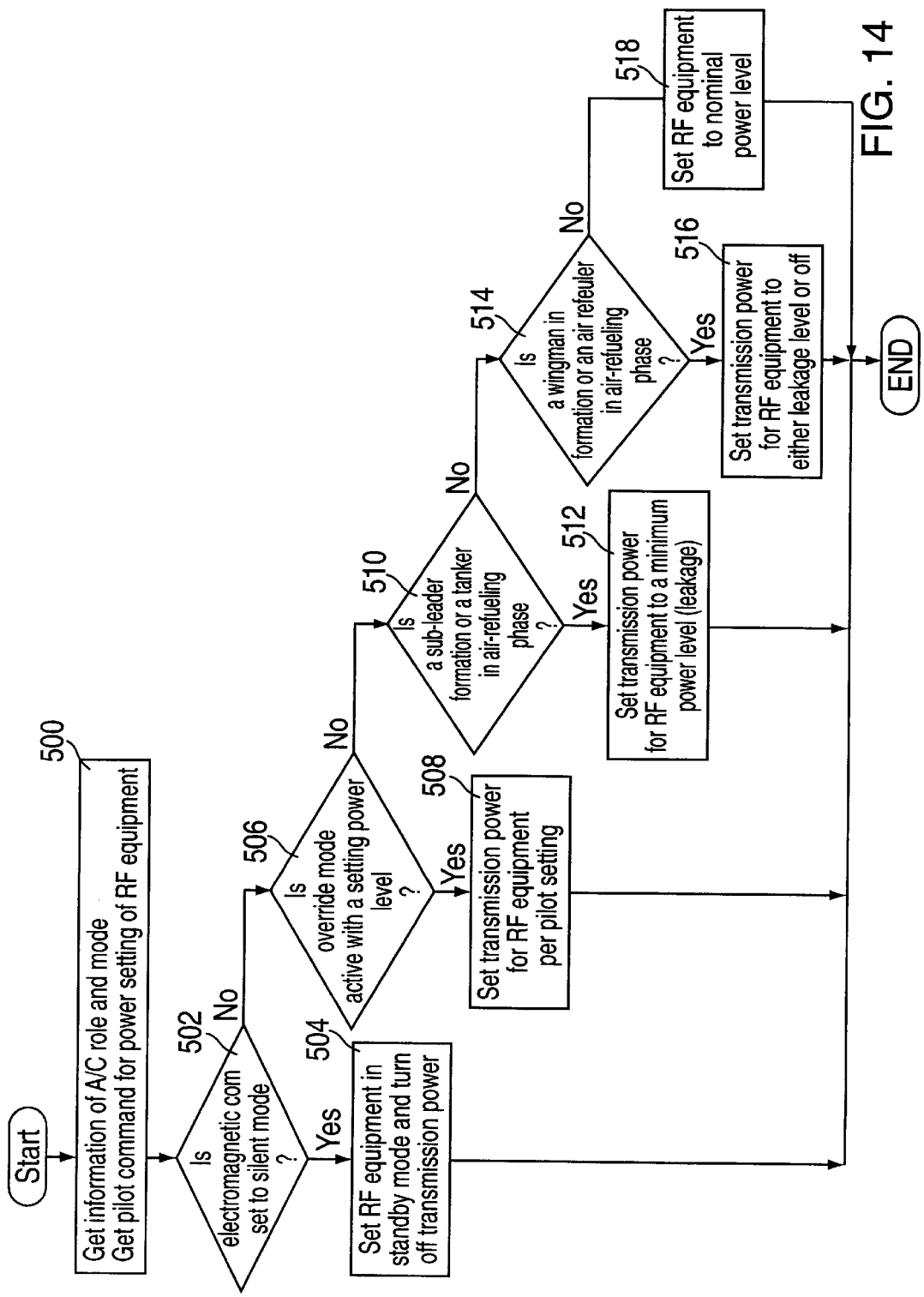

MIDAIR COLLISION AND AVOIDANCE SYSTEM (MCAS)

CROSS-REFERENCE TO RELATED APPLICATIONS

This application is a continuation of U.S. application Ser. No. 09/538804, entitled "Midair Collision Avoidance System", filed Mar. 30, 2000, which in turn was based on U.S. Provisional Application Ser. No. 60/128,655, entitled "Midair Collision and Avoidance System (MCAS)" filed Apr. 8, 1999.

BACKGROUND OF THE INVENTION

The present invention relates generally to the field of avionics for collision avoidance systems (CAS). More specifically, the present invention relates generally to airborne traffic alert and collision avoidance systems and transponders.

Spurred by the collision of two airliners over the Grand Canyon in 1956, the airlines initiated a study of collision avoidance concepts. By the late 1980's, a system for airborne collision avoidance was developed with the cooperation of the airlines, the aviation industry, and the Federal Aviation Administration (FAA). The system, referred to as Traffic Alert and Collision Avoidance System II (TCAS II) was mandated by Congress to be installed on most commercial aircraft by the early 1990's. A chronology of the development of airborne collision avoidance systems can be found in "Introduction to TCAS II," printed by the Federal Aviation Administration of the U.S. Department of Transportation, March 1990.

The development of an effective airborne CAS has been the goal of the aviation community for many years. Airborne collision avoidance systems provide protection from collisions with other aircraft and are independent of ground based air traffic control. As is well appreciated in the aviation industry, avoiding such collisions with other aircraft is a very important endeavor. Furthermore, collision avoidance is a problem for both military and commercial aircraft alike. In addition, a large, simultaneous number of TCAS interrogations from close-in formation aircraft members generate significant radio frequency (RF) interference and could potentially degrade the effectiveness of maintaining precise position/separation criteria with respect to other aircraft and obstacles. Therefore, to promote the safety of air travel, systems that avoid collision with other aircraft are highly desirable.

Referring to FIG. 1, there is shown a block diagram of a conventional TCAS system. Shown in FIG. 1 are TCAS directional antenna 10, TCAS omni-directional antenna 11, and TCAS computer unit 12, which includes receiver 12A, transmitter 12B, and processor 12C. Also shown are aural annunciator 13, traffic advisory (TA) display 14, and resolution advisory (RA) displays 15. Alternatively, the TA and RA displays are combined into one display (not shown). The transponder is comprised of transponder unit 16A, control panel 16B, and transponder antennas 16C and 16D. The TCAS and transponder operate together to function as a collision avoidance system. Those skilled in the art understand that this is merely illustrative of a conventional TCAS. For example, many other configurations are possible such as replacing omni-directional antenna 11 with a directional antenna as is known to those skilled in the art. The operation of TCAS and its various components are well known to those skilled in the art and are not necessary for understanding the present invention.

In a TCAS system, both the interrogator and transponder are airborne and provide a means for communication between aircraft. The transponder responds to the query by transmitting a reply that is received and processed by the interrogator. Generally, the interrogator includes a receiver, an analog to digital converter (A/D), a video quantizer, a leading edge detector, and a decoder. The reply received by the interrogator consists of a series of information pulses which may identify the aircraft, or contain altitude or other information. The reply is a pulse position modulated (PPM) signal that is transmitted in either an Air Traffic Control Radar Beacon System (ATCRBS) format or in a Mode-Select (Mode-S) format.

A TCAS II equipped aircraft can monitor other aircraft within approximately a 20 mile radius of the TCAS II equipped aircraft. (U.S. Pat. No. 5,805,111, Method and Apparatus for Accomplishing Extented Range TCAS, describes an extended range TCAS.) When an intruding aircraft is determined to be a threat, the TCAS II system alerts the pilot to the danger and gives the pilot bearing and distance to the intruding aircraft. If the threat is not resolved and a collision or near miss is probable, then the TCAS II system advises the pilot to take evasive action by, for example, climbing or descending to avoid a collision.

The TCAS 2000 is a TCAS-II system, which is currently in operation on many commercial and military aircraft. This system is very effective in providing midair collision avoidance in civil Air Traffic Control (ATC) airspace. TCAS was designed to provide effective midair collision avoidance in civil Air Traffic Control (ATC) airspace determining the range, altitude, and bearing with other aircraft equipped with Mode S/ATCRBS transponders. It monitors the trajectory of these aircraft for the purpose of determining if any of them constitute a potential collision hazard. The system is responsible for estimating the projected intruder track and determining if a potential conflict exists. If a conflict is detected, the system displays an advisory to the pilot. The system also provides guidance for vertical avoidance maneuver, known as Resolution Advisories (RAs). Complementary avoidance maneuvers between two TCAS equipped aircraft are ensured by automatic coordination of mutual intentions with the other aircraft through the Mode S transponders and associated TACS.

However, the TCAS 2000 originally was not designed to handle unique mission capabilities, which would be required, for example, by military aircraft. Examples of such unique mission capabilities are: operate in a tactical environment (tactical speed and dynamic maneuvers), perform highly dynamic, close-in formation flight, rendezvous, and air-refueling. At the same time, the system must effectively detect and avoid midair collision situation.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention comprises:

The Missionized Midair Collision Avoidance System (MCAS) of the present invention is an upgraded system which, preferably, is based upon Honeywell's new second generation Traffic Alert and Collision Avoidance System (TCAS) 2000. The present invention bridges the functional gaps, which will allow Navy and Marine Corps aircraft to operate in a tactical environment as effectively as in the air traffic management (ATM) environment. In order to distinguish between the tactical and ATM modes of an MCAS system, a preferable embodiment recommends that all MCAS functional capabilities can be allocated in two functional modules, the ATM module and Tactical module.

The ATM module contains the core TCAS 2000 functions, which can provide traffic advisory (TA) and resolution advisory (RA) capabilities for an aircraft to handle collision avoidance situation in the ATM environment. The ATM module is based on the TCAS 2000 system which currently complies with the Federal Aviation Administration (FAA) Technical Standard Order (TSO)—C119a. The ATM module is easily upgradeable to incorporate any of these changes in order to be compliant with future ATM requirements.

To minimize the certification process for TCAS related functions and to address specifically the operational requirements of aircraft, such as those used by the U.S. Navy and Marine Corps aircraft, all of the missionized capabilities required to operate in a tactical environment are allocated to the Tactical module. The module will work in conjunction with the ATM module to provide the following mission attributes: quick-time response, resistant to jamming and interference, and minimized detection beyond a short distance. The primary function of the Tactical module is to provide tactical traffic advisories, tactical traffic resolutions, display and control to support formation flight, rendezvous, and air refueling in a high-dynamics environment.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

Figure 1:
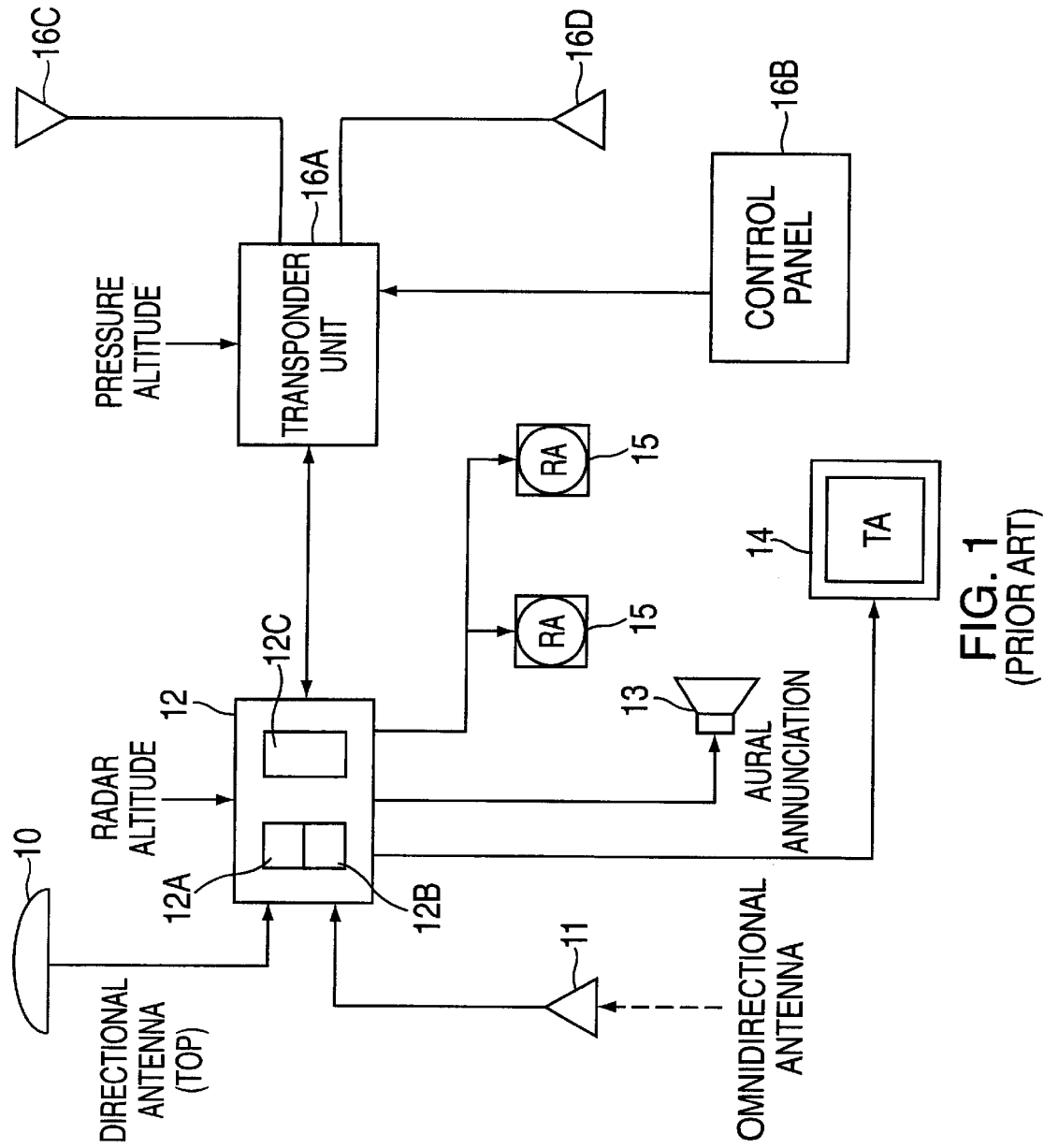
FIG. 1 (prior art) is a block diagram of a conventional TCAS.
Figure 2:
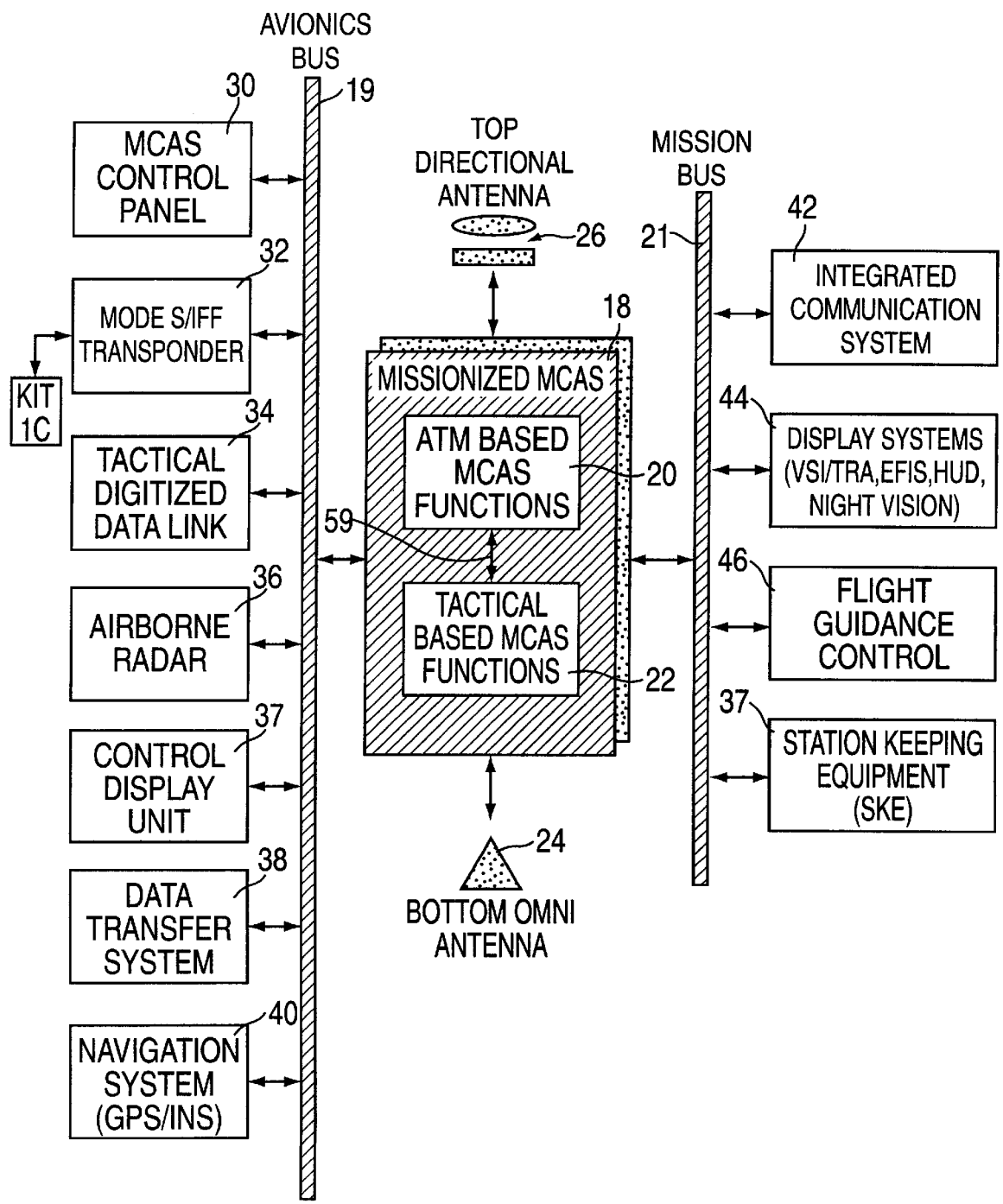
FIG. 2 is a block diagram of the TCAS in accordance with the present invention.

The MCAS 18 provides collision avoidance solutions and unique mission capabilities such as formation flight, rendezvous, and air refueling for aircraft (e.g., F-18, Navy and Marine Corps AV-8B, H-1, H-46, V-22B, S-3, F/A-18, and unmanned aerial vehicle). The system's two functional modules, ATM 20 and Tactical 22 shown in FIG. 2 perform a set of designed MCAS functions based on the operational environment and pilot selection of specific mission capabilities.

When the aircraft is operating in a pure ATM environment, then MCAS 18 is an onboard advisory system designed to act as a backup to the ATC radar and the "see and avoid" principle. The system has a surveillance envelope defined by a horizontal radius of approximately 40 nautical miles and an unlimited vertical range. The system continually surveys the airspace around the aircraft, seeking replies from other aircraft ATC transponders. The transponder 32 replies are managed by the ATM module 20. Currently, flight paths are predicted based on their tracks. Flight paths predicted to penetrate a collision area surrounding the MCAS 18 aircraft are annunciated by MCAS. The ATM module 20 generates two types of annunciations: Traffic Advisory (TA) and Resolution Advisor (RA). All annunciations can be integrated within current display architectures, and will not require additional display surfaces.

When the operational environment changes to a tactical mode, MCAS 18 is also a control and display system. The preferred system is capable of processing pilot commands and activating appropriate mission capabilities to allow an aircraft to perform either as a formation leader, wingman (follower), a follower leading another aircraft, rendezvous aircraft, or as a tanker aircraft. In this mode, MCAS 18 uses a different time-based dimension model to track tactical aircraft and determine air traffic and collision avoidance situations. The model has tighter time constraints than the ATM model, and is based upon a level of lethality of an air collision, for a tactical environment, equally distributed in all directions of three dimensional space.

If the operational environment is a mixture of ATM and Tactical, then the ATM module 20 is responsible for providing traffic advisory and resolution advisory for non-tactical aircraft while the Tactical module 22 is responsible for providing tactical traffic advisory and tactical resolution advisory. The Tactical module will also handle control and display requirements for mission specific functions. An aircraft equipped with MCAS 18 will have extensive advisory capabilities as shown in FIG. 3.

Figure 4:
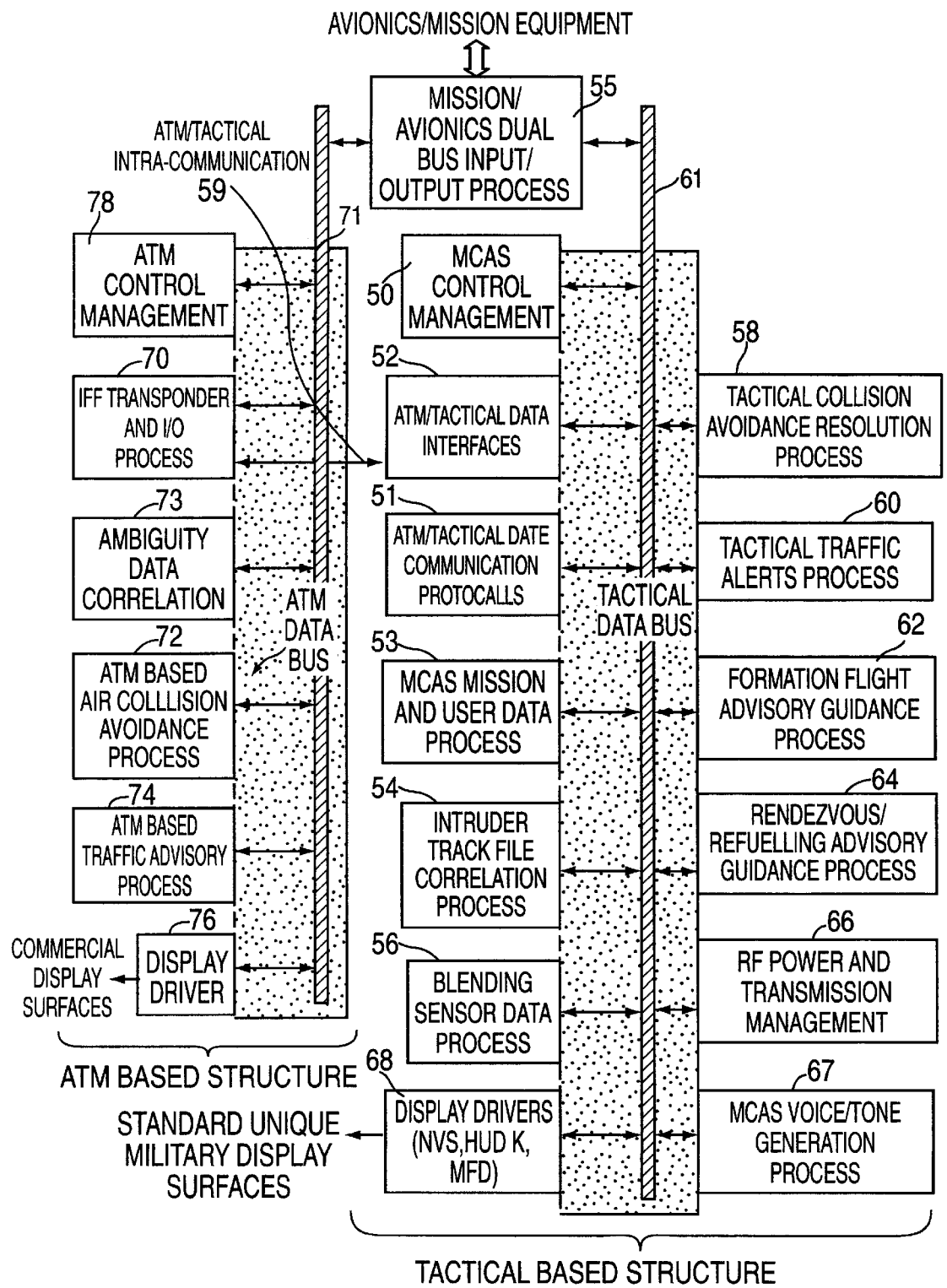
FIG. 4 is a block diagram of the modes (civil, tactical, or both) of operation of the TCAS system in accordance with the present invention.
Figure 5:
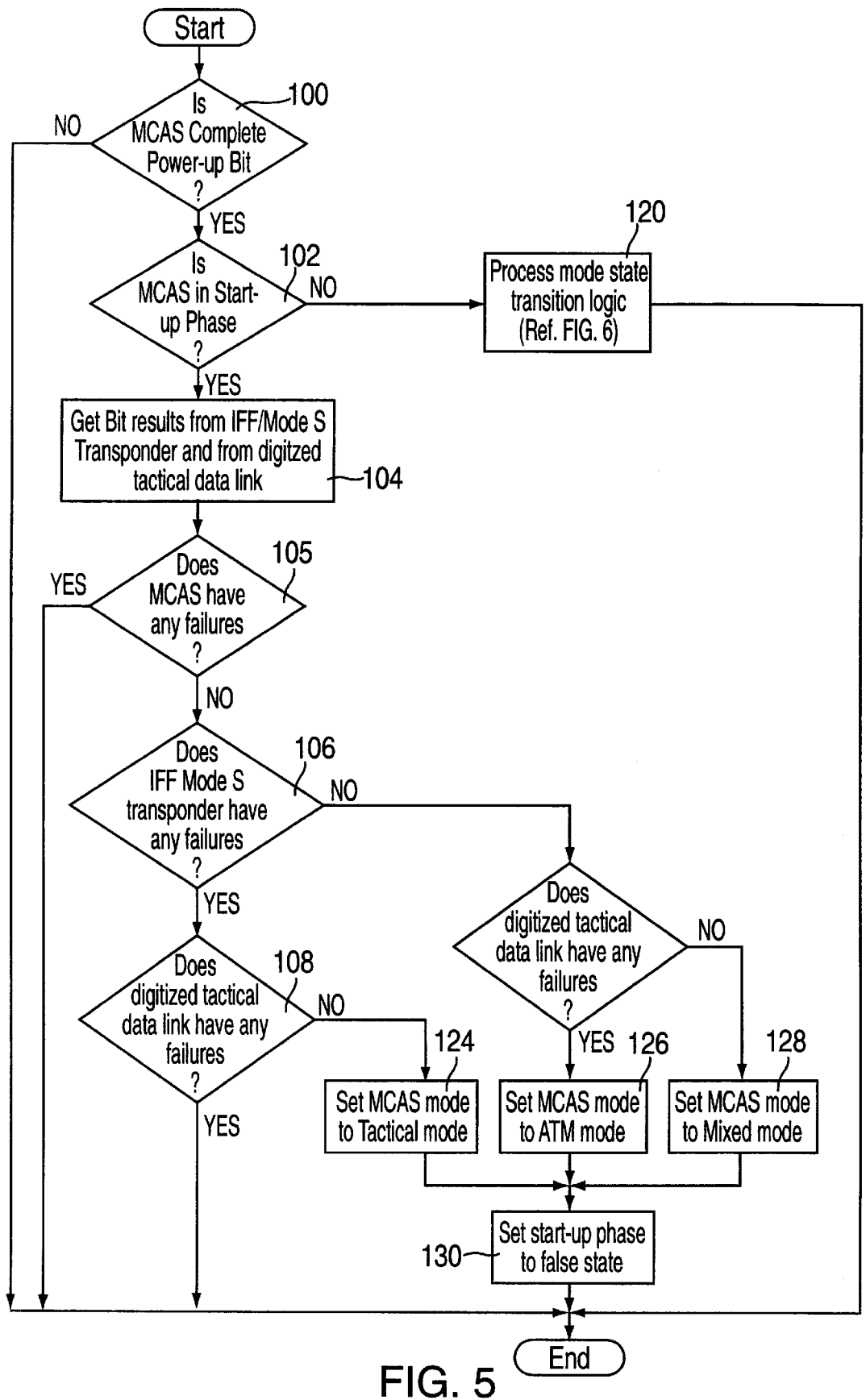
FIG. 5 is a block diagram of the functional partition of the ATM module and the Tactical module of the TCAS computer in accordance with the present invention.

MCAS 18 will evaluate input data, pilot command, and operational status of the onboard equipment to set a system mode state active, which can be either Civil ATM mode 20, Tactical mode 22, or Mixed mode as illustrated in FIG. 4. Once a MCAS mode becomes active, the system will activate the functions contained in either the ATM module or the Tactical module, or in both modules for the case of mixed mode. The main functions embedded in each module are shown in FIG. 5.

In the Civil ATM mode, the system will track all aircraft in the surrounding airspace and generate traffic advisories (TAs) or resolution advisories (RAs), as the situation requires. Vertical guidance to avoid midair collision is accomplished by interrogating the Mode A, Mode C, and Mode S transponders of potential threat aircraft, tracking their responses, and providing advisories to the flight crew to assure vertical separation. Two levels of advisories are provided: 1) traffic advisories indicate range, bearing, and relative altitude of the intruder to aid in visual acquisition of the intruder; and 2) resolution advisories indicate what vertical maneuver needs to be performed or avoided in order to assure safe separation.

Figure 3:
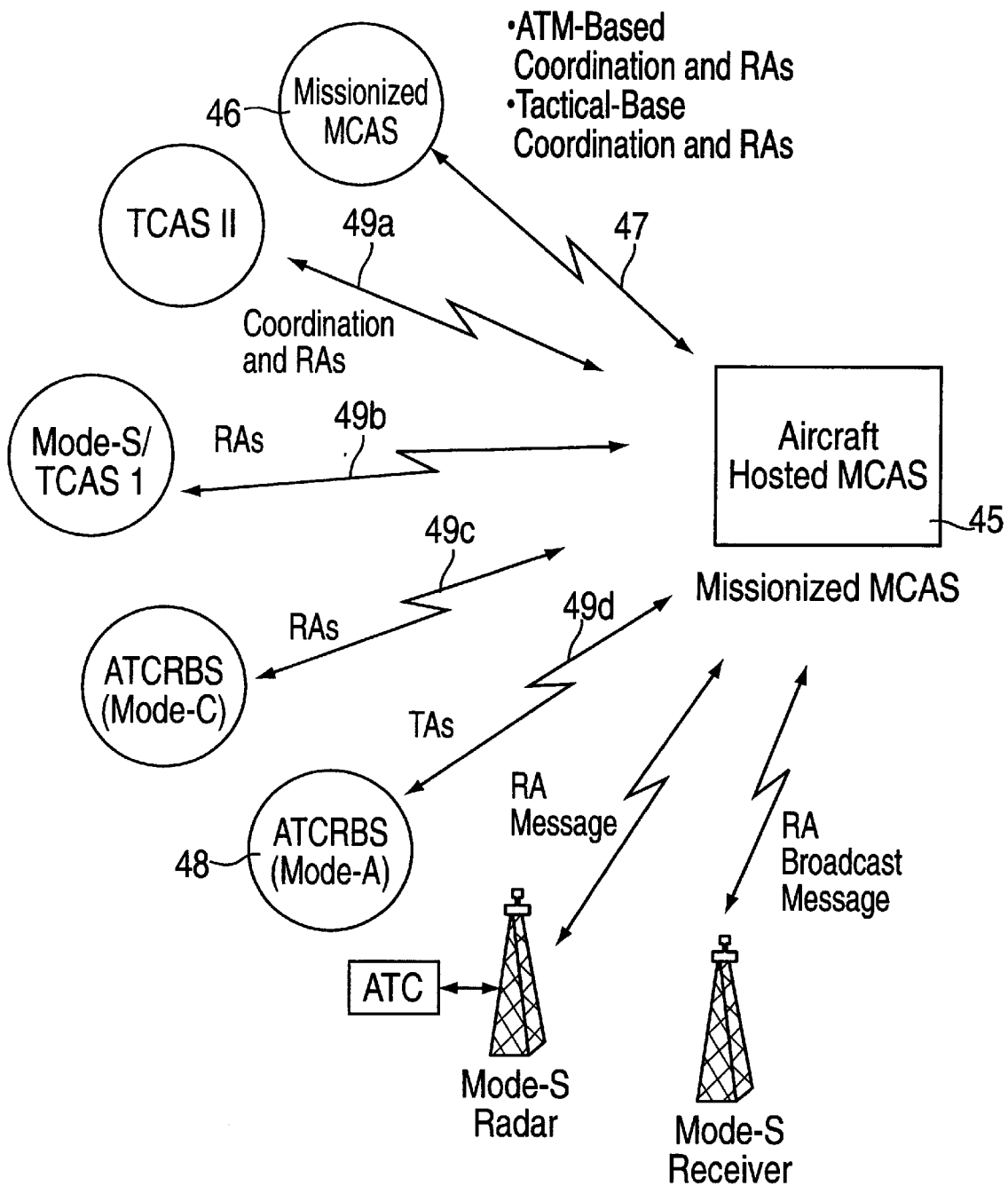
FIG. 3 is block diagram of the advisory capabilities of the TCAS in accordance with the present invention.

FIG. 3, shows the various types of intruder equipment and the resulting advisories. It should be noted that Mode A only equipped intruders will result in detection and display of TAs only. An intruder not equipped with a transponder is invisible to MCAS unless it has a digitized tactical data link.

ATM-based MCAS functions will generate both RAs and TAs when the transponder is in Mode S operation. The two types of advisories correspond to time-based protection zones around the aircraft. The airspace around the MCAS aircraft, where an RA is annunciated, represents the warning area; while the larger airspace, which results in a TA being annunciated is the caution area.

In the Tactical mode, the MCAS will perform the array of CAS functions as described herein.

Referring again to FIG. 2, pilot input data to the MCAS 18 can be entered into the system through various means that include MCAS Control Panel, keyboard unit, control and display unit, and Data Transfer System 38. The utility of the input data is to indicate to the system the operational environment, activate specific mission capabilities, signal formation flight events, and report the progressive stage of a mission. The MCAS 18 evaluates this information to determine the system mode of operation. The input data to the MCAS can include, but not be limited to:

- selected operational environment—either Civil ATM, Tactical, or Mixed,
- formation flight mode
- aircraft role in a formation flight—either a leader, follower, or both
- specified vertical and lateral offsets
- rendezvous mode
  - aircraft role in a rendezvous/air-refueling—either a tanker or a re-fueler
  - rendezvous position and time
  - transitional sequence from rendezvous to air-refueling
  - termination of air refueling
- own aircraft identification (ID)
- identification of other interested aircraft
- mission identification
- aircraft data—latitude, longitude, airspeed, pitch and roll
- predicted track—10, 20, 30, 60, 90 second position correlated to flight plan.

In conjunction with Mode S data link, the digitized tactical data link 34 will not only be used to broaden the reception bandwidth for the MCAS related data, but also provide a reliable backup data source in a tactical environment, possibly including jamming and radio frequency (RF) interference. Navy and Marine Corps' digitized tactical data link capability for example, can be an important medium to pipe in mission and navigation data from other military aircraft, ships, and ground vehicles. Many important features provided by direct data link include secure data, robustness in terms of transmitting and request to retransmit, built-in error correction, and data compression from any of the used communication protocols. These include the Marine Tactical System (MTS) protocol, JPEG, or a selected tri-service communication protocol. The frequency of transmit data link can be defaulted to a medium rate for the sole purpose of tactical collision avoidance, and can be increased to a higher rate in order to accommodate a tight formation flight and during air-refueling operations. For instance, in a formation flight, tactical data link of the leader aircraft will be scheduled to transmit at a minimum rate of 25 Hertz. If a fighter aircraft operates at a tactical speed or in a dynamic maneuvering environment, then data link will also need to be operated at a higher rate. For a rendezvous mission, when two aircraft are still far apart, the transmission can be set at a low rate, e.g., from 1 to 2 Hertz. The rate will switch to a higher rate as the tanker is approaching the rendezvous location.

A tactical data link packet would consist of data regarding instantaneous host aircraft position, source of navigation, datum, accuracy index, barometric altitude, radar altitude, velocity vector, acceleration vector, flight phase/maneuver sequence events, control and guidance mode, and control target settings. All data will be time tagged with a precise universal time provided by the Global Position System (GPS) segment. This allows the MCAS 18 to correlate position and vertical separation data in near real-time in order to predict and calculate accurate collision avoidance control maneuvers. The MCAS can also calculate the control guidance necessary to maintain the lateral and vertical offsets from the leader in the case of a formation flight or from a tanker in the case of air-refueling. Although much of the navigation dynamic data will be overlapped with the data obtained from extended IFF Mode S, the data provided by the tactical data link 34 will serve as complementary or backup in the computations required for tactical collision avoidance. In addition, any MCAS advisories currently being presented to a formation leader can be made available to the follower aircraft, along with maneuvering events such as start-climb, start-descend, roll-in, roll-out, level-out, etc.

The present invention provides a capability to manage both the power level of RF radiating source and the transmission rate for equipment operating in RF spectrum. Referring again to FIG. 2, equipment in this group includes a Mode-S/IFF transponder 32, airborne radar 36, Station Keeping System (SKE) 36, and any tactical radios that might be used to support the digitized tactical data link. The system will monitor pilot selection to control power setting levels for the equipment, and periodically schedule for transmitting data per request, requesting tactical/mission data, or just broadcasting. If the pilot selects to operate in a silent mode, then the system will inhibit all transmissions, but will continue to operate in a passive mode by purely receiving data from the IFF extended Mode S and digitized tactical data link to provide CAS solutions.

The present invention provides a grateful degradation for all modes of operation. The system provides logic to select the best possible sensor data for CAS computations. The complementary data from Digitized Tactical Data Link 34, Airborne Radar 36, and Station Keeping Equipment (SKE) 36 will be used to enhance the primary IFF Mode S/Transponder 32 data, fill any data gaps, or back-up. The computed range and bearing data from the digitized tactical data will be combined with that of the IFF "Diversity" transponder whenever the data is available and valid. The blended information will be used to determine if another aircraft is in the caution region, warning region, or about to penetrate the collision region.

Referring to FIG. 5, if the aircraft is a wingman in the formation, then the Blending Sensor Data function 56 will combine the time-tagged data from the transponder, extended Mode S/IFF, and digitized tactical data link to instantaneously compute a relative position target with respect to the leader position. This information will then be used to calculate vertical and lateral deviations, relative velocity, and relative acceleration. These parameters in turn are used as inputs to the flight guidance control laws to generate flight director and flight control commands for the purpose of CAS advisory display and coupled with the flight control system.

It is important to note that since CAS data comes from many different sources, it is necessary that this data be correlated in terms of mission ID, aircraft ID or flight number. This is to ensure that the data coming from the same aircraft will be blended and used in processing collision avoidance solutions, formation flight control and guidance, air-refueling control guidance, and MCAS display.

Figure 6:
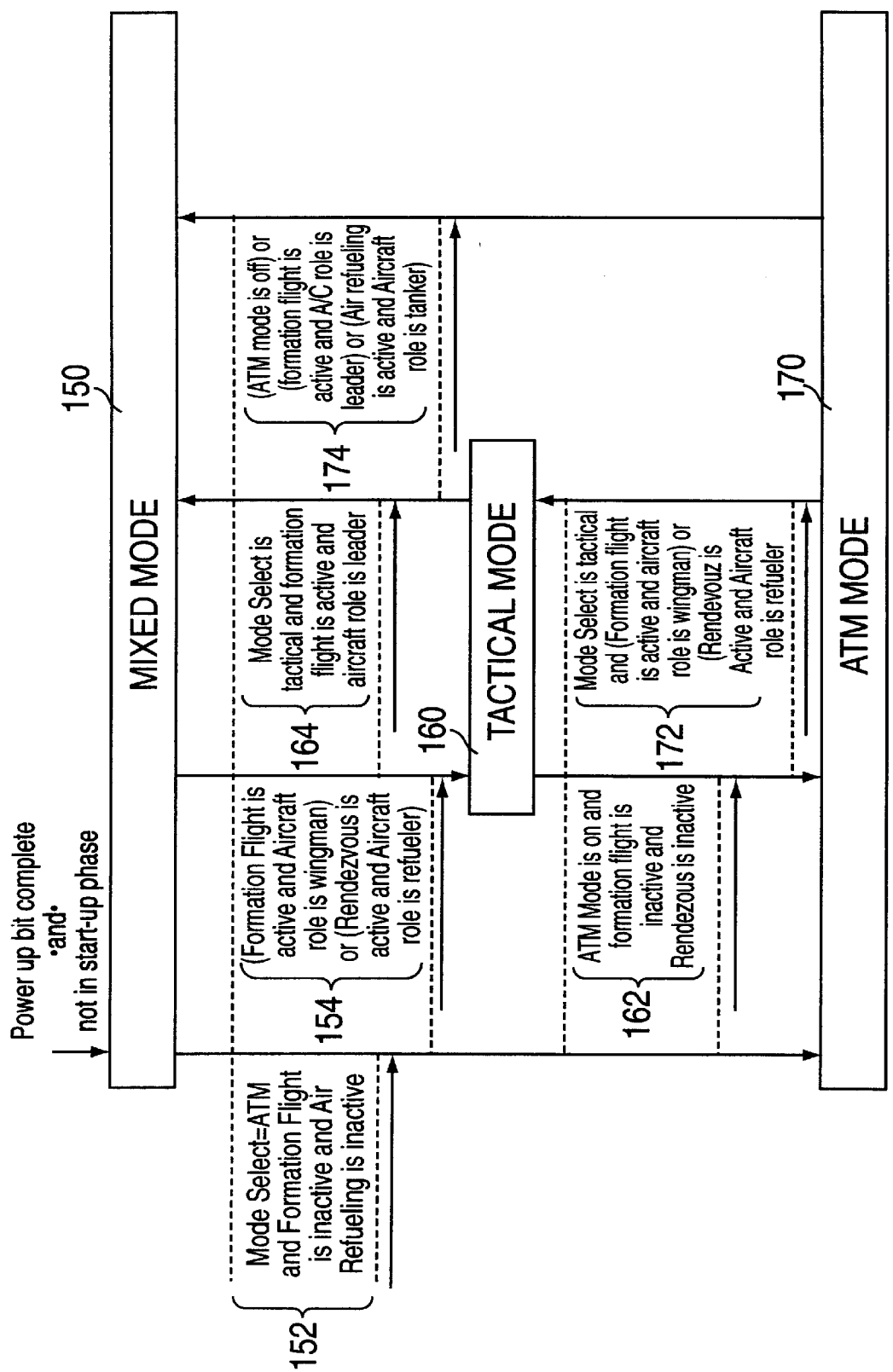
FIG. 6 is an elevation view of the display of the tactical TCAS in accordance with the present invention.
Figure 7:
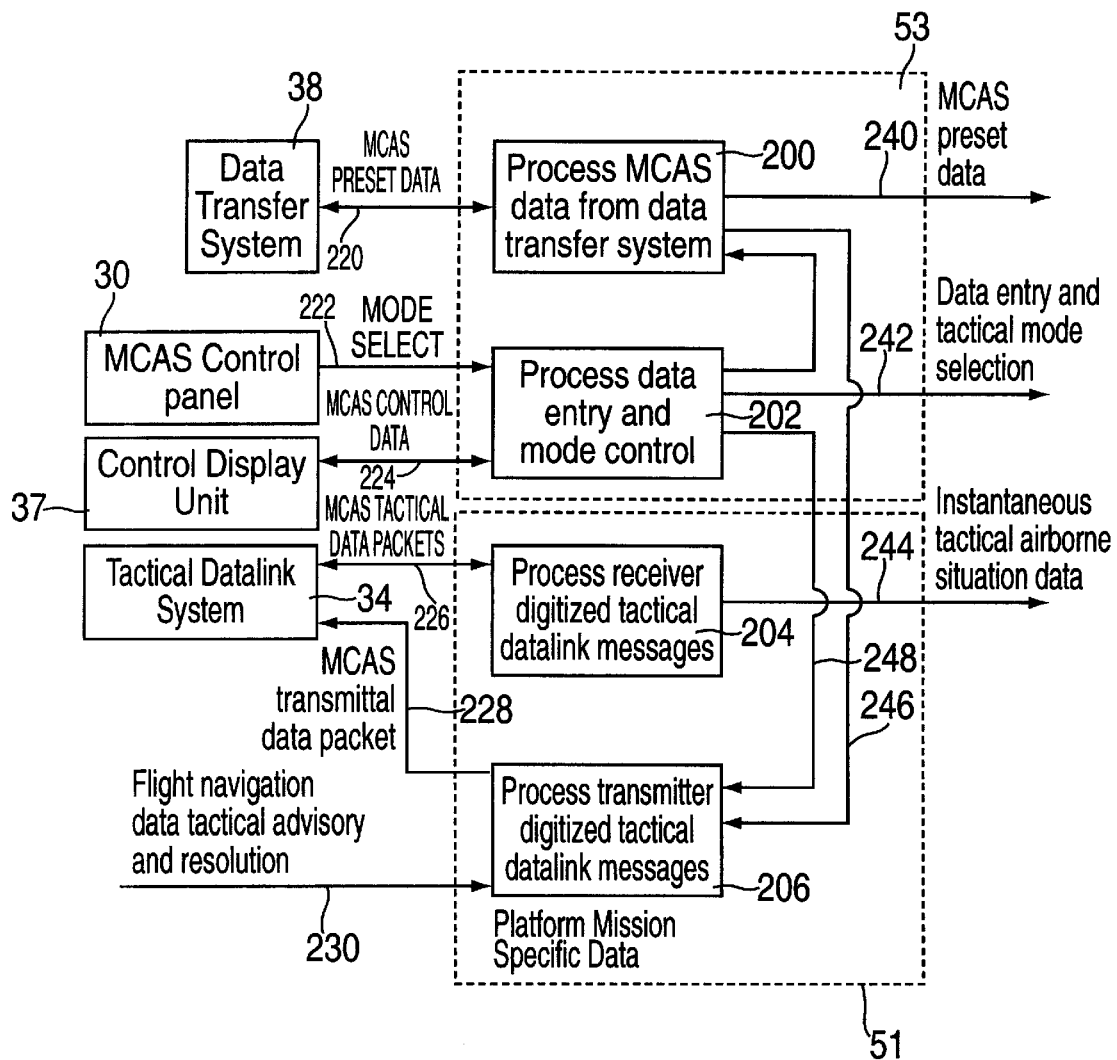
Figure 8:
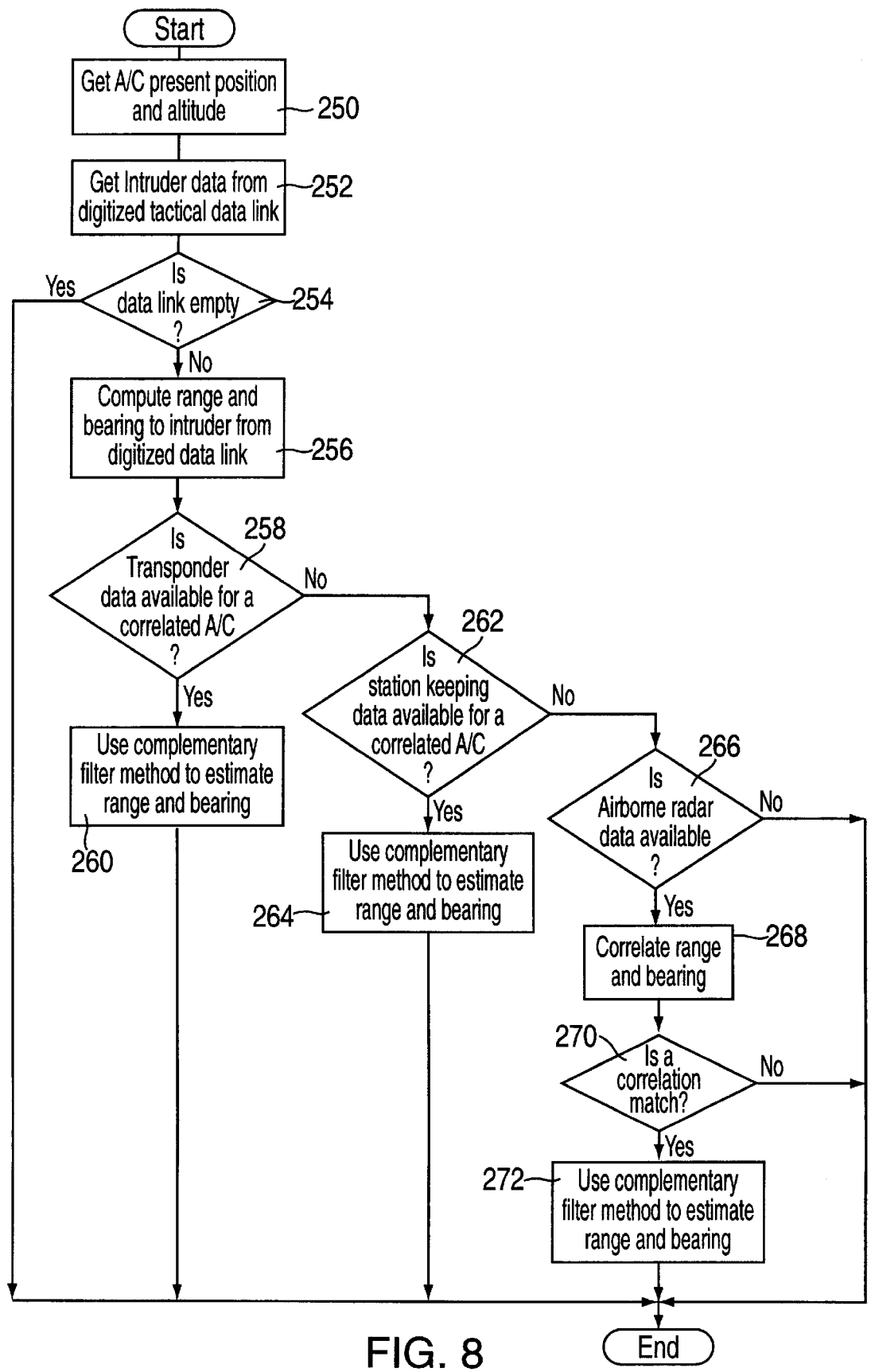
Figure 9:
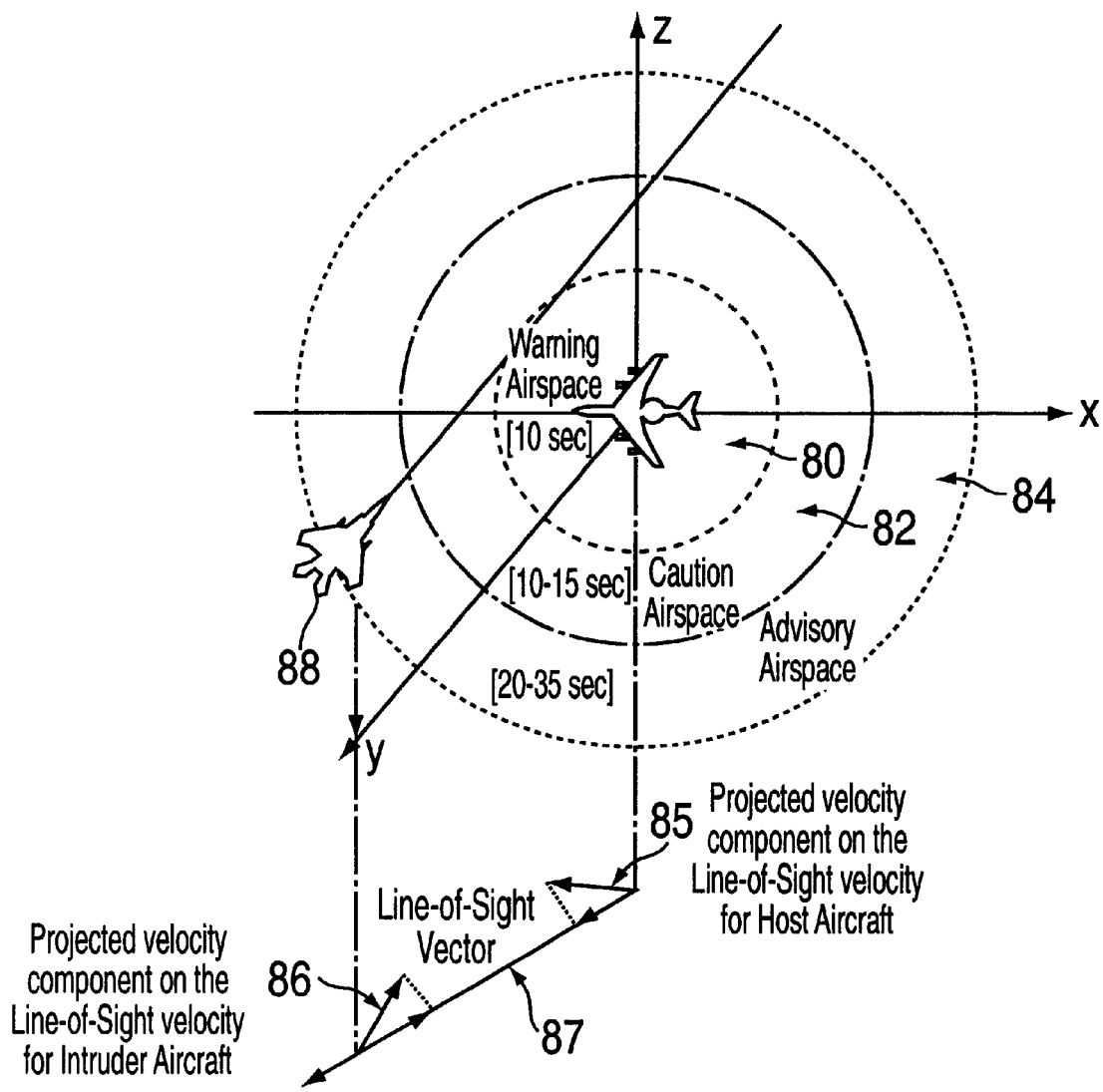
Figure 10B:
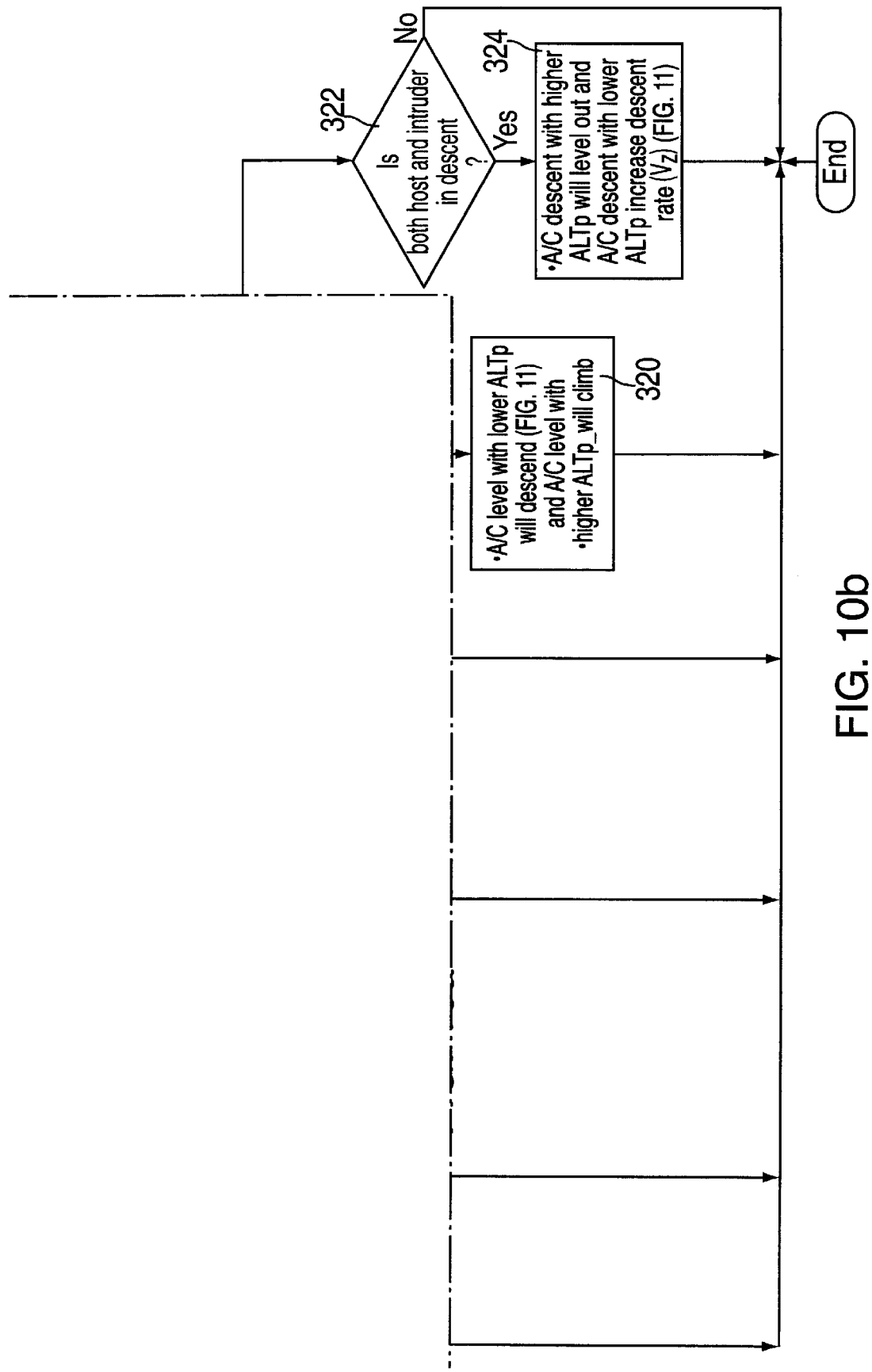
Figure 12:
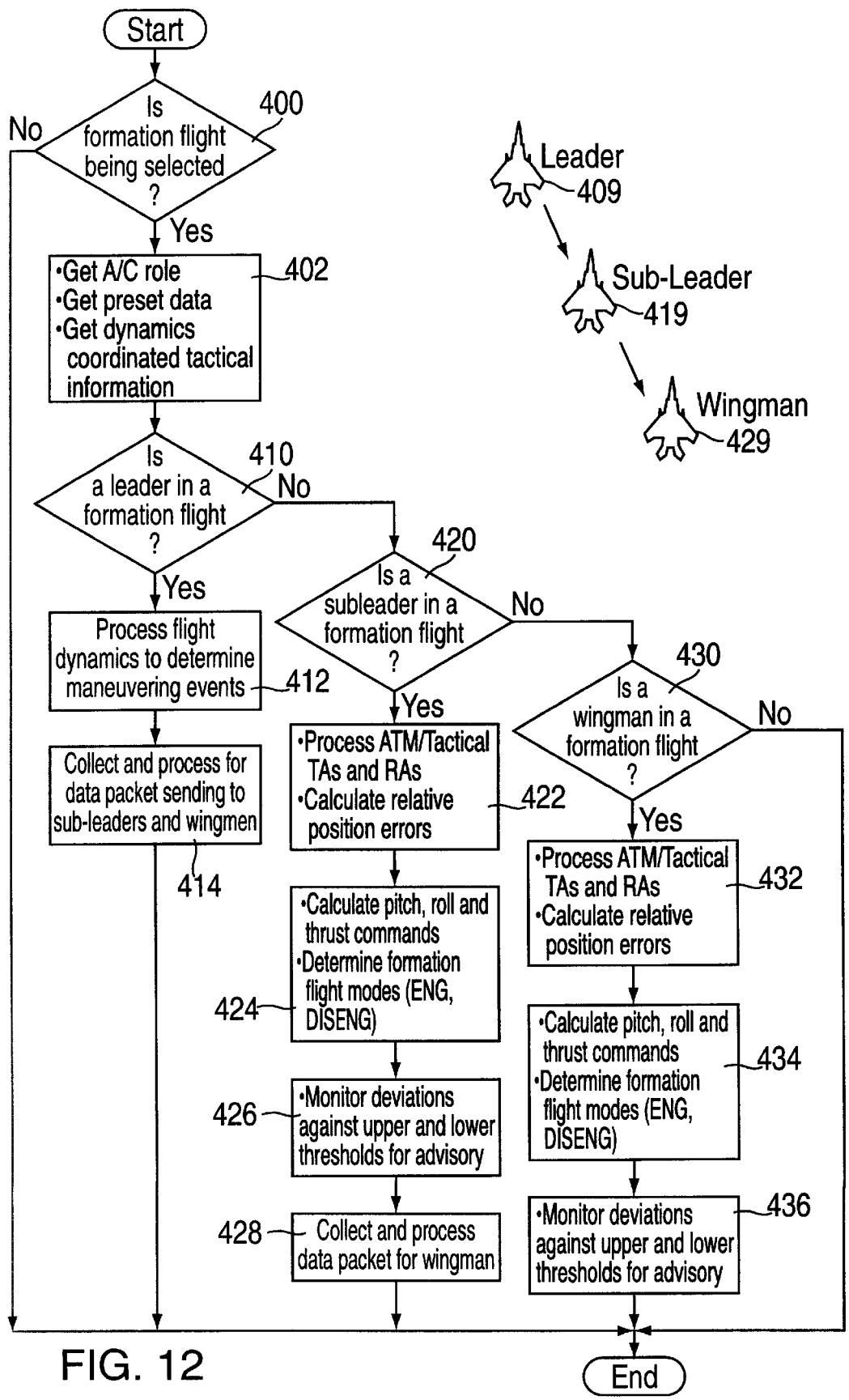
Figure 13:
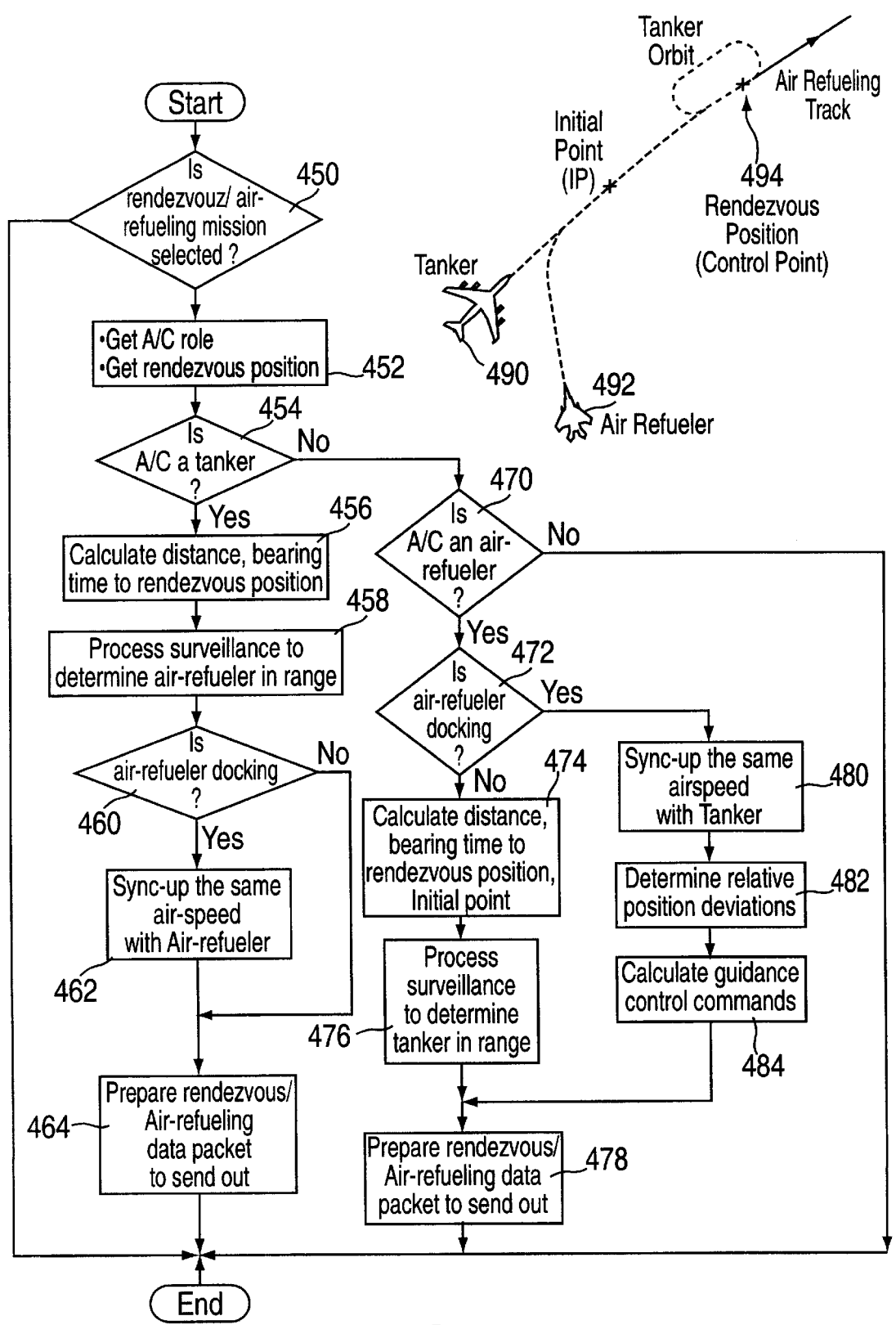
Figure 15A:
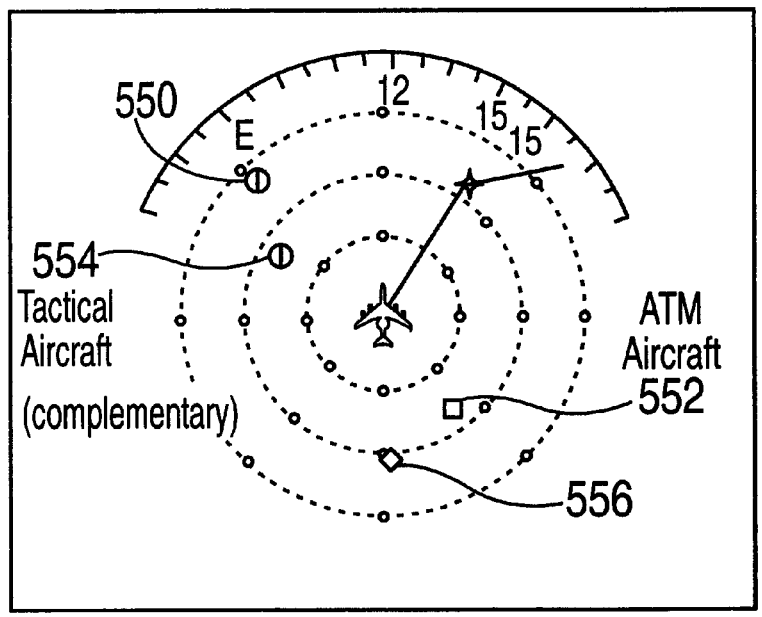
Figure 15B:
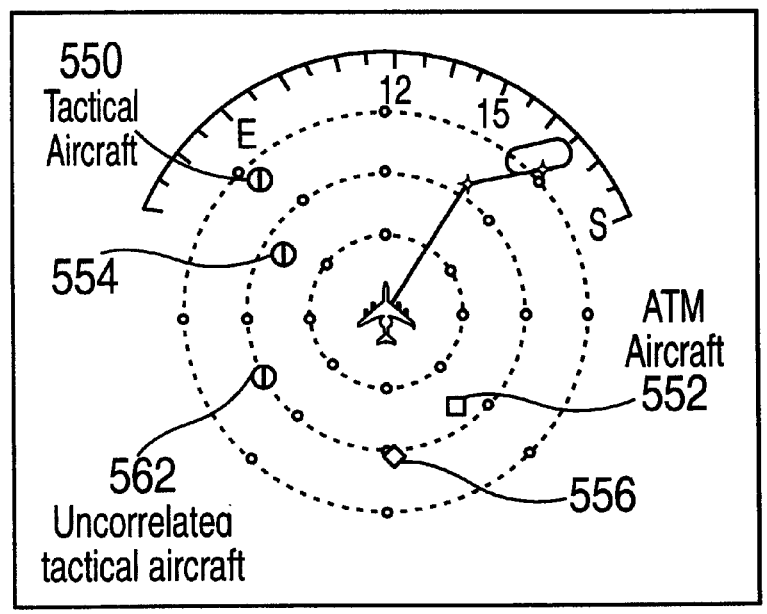
Figure 15C:
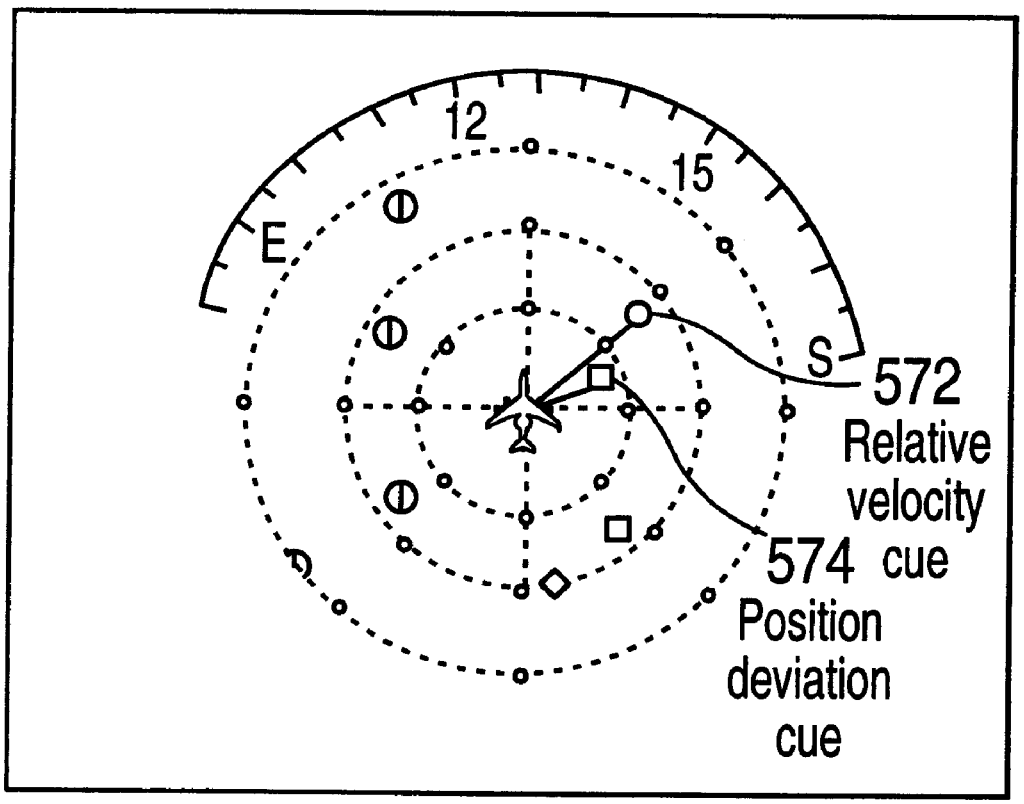

In the Tactical mode, the MCAS determines if the aircraft's current track being projected will intersect with the track of an intruder track. The MCAS then monitors a time-based dimension model as illustrated in FIG. 6 with three CAS influence spheres (80, 82, 84). The inner sphere 80, which is defined as a collision sphere, extends from the aircraft equipped with MCAS to an intruder aircraft within about 10 seconds before two aircraft converge to a collision point in midair. The middle sphere 82, which is defined as a warning sphere, is extended with an additional 15 seconds time from the collision sphere. If an intruder penetrates the boundary of the warning sphere, an escape strategy in the form of a tactical avoidance resolution advisory (RA) such as evasive maneuvers will be generated to guide the pilot. The RA is a vertical maneuver and/or a lateral maneuver based on vertical situation with respect to other aircraft in the defined airspace and local terrain situation. MCAS monitors a time-based dimension of a caution sphere 84 that extend up to 50 seconds from the time the intruder enters the MCAS aircraft's collision region. If the aircraft is either a formation leader or a tanker, then MCAS 18 will send the tactical TAs and RAs to formation followers and refueling aircraft for their systems to process.

The MCAS 18 with an Automatic Dependent Surveillance Broadcast (ADS-B) data reception/processing capability and combined with digitized tactical data link capability can be extremely useful in a formation flight. ADS-B messages broadcast from the Mode-S transponder every second or two contain aircraft's position, magnetic heading, velocity, intended flight path, barometric altitude, and flight number. This extended data transmission is also referred as Mode-S/GPS squitter. Working in the Tactical mode, MCAS 18 could provide pilots constant situation awareness of relative position of formation aircraft, flight director cues such as relative position box, relative velocity circle, and relative acceleration circle symbols. With combined information from both the Mode-S/GPS squitter and the digitized tactical data link, MCAS can display accurate aircraft formation. MCAS interrogations could be inhibited and relative aircraft position can be derived from either ADS-B or tactical data link.

The MCAS 18 can be extremely helpful in rendezvous operations. The system can allow both the tanker and the refuelers to maintain precise situation awareness during all phases of the operation. The MCAS displays range, bearing, and relative altitude. These key parameters can be used to identify another aircraft or formation element relative location and hence improve the efficiency and mission times for in-flight rendezvous events. With Mode-S/GPS squitter data periodically transmitted by an aircraft's Mode-S transponder can be received and processed by another aircraft's MCAS. The advantage for rendezvous with ADS-B and digitized tactical data link is relative position, range, and arrival time can be displayed more accurate. Relative range and bearing will be calculated by MCAS based upon GPS position broadcasted by the Mode S transponder or received by digitized tactical data link system. When making close encounters with other aircraft for rendezvous purposes, the MCAS equipped aircraft will inhibit tactical traffic and resolution advisories and allow transition to an air-refueling mode to take place.

In the Mixed mode, the MCAS will have to process CAS solutions in parallel. For a non-tactical aircraft, the computations required to generate TAs and RAs can be performed in an ATM module 20. For a tactical aircraft, the computations required to generate tactical TAs and RAs will be performed in a Tactical module 22. However, in order to remove any ambiguities in identifying an aircraft as tactical versus non-tactical, the system will provide a linkage to share the real time information being obtained and processed in two modules.

The ATM module 20 currently has the display capabilities to drive a Vertical Speed Indicator/Traffic-Resolution Advisory (VSI/TRA) color display unit and/or Electronic Flight Instrument System (EFIS). To accommodate additional display capabilities often required in a military aircraft, the Tactical module 22 could provide display drivers 68 for Night Vision System (NVS), Multi-Function Display (MFD), and/or Head-up Display (HUD) System.

The MCAS processing modules are the core components of the MCAS. The ATM module 20 contains the necessary interfaces to the RF transmitter and receivers, which interrogate and receive replies from other transponder-equipped aircraft. The Tactical module 22 contains communication protocols to interface with a digitized tactical data link system, mission equipment, and pilot interface unit to communicate with tactical aircraft. Multi-processors are utilized to implement the surveillance and collision avoidance and then determine the appropriate guidance response to avoid a midair or near midair collision. In addition, output data is provided to drive displays that inform the pilot as to what action to take or avoid, and coupled with the flight control system for automatic control as in the case of an unmanned aerial vehicle.

Currently these systems do not output the type of information needed to perform the MCAS functions. They only output display type information and don't provide information such as tracked aircraft and etc. Even the Honeywell system would have to be modified to provide this information externally.

A preferable Mode-S transponder is the Honeywell Mode-Select (Mode-S) Data Link Transponder (product no. XS-950), which is a "full-feature" system implementing all currently defined Mode-S functions--but with built-in upgrade ability for future growth. As will become apparent to those skilled in the art, other Mode-S transponders can be used in the present invention. Current Mode-S transponders are used in conjunction with TCAS and ATCRBS to identify and track aircraft position, including altitude. The Mode-S Data Link Transponder XS-950 product transmits and receives digital messages between aircraft and air traffic control. It meets all requirements for a Mode-S transponder as described in DO-181A, including Change 1. The unit also conforms to ARINC Characteristic 718 with interfaces for current air transport applications. The Mode-S transponder is capable of transmitting and receiving extended length Mode-S digital messages between aircraft and ground systems. The data link provides more efficient, positive, and confirmed communications than is possible with current voice systems.

Software in the Mode-S transponder is completed and certified to DO-178B, the FAA requirement for software development and certification.

Software updates can be completed on-board the aircraft by means of, for example, an ARINC615 portable data loader, which has a data loader port located on the front connector. All of the foregoing software modifications are well within the skill of those skilled in the art and their implementation need not be discussed in detail.

The Honeywell XS-950 S/I Mode S Data Link Transponder is a "full-feature" system implementing all currently defined Mode S functions—but with built-in upgradeability for future growth. Current Mode S transponders are used in conjunction with TCAS and Air Traffic Control Radar Beacon System (ATCRBS) to identify and track aircraft position, including altitude. This transponder, specifically developed for the air transport market, transmits and receives digital messages between aircraft and air traffic control. The data link provides more efficient, positive, and confirmed communications than is possible with current voice systems.

The XS-950 S/I is an ICAO "Level 4" system, which means that it will transmit and receive 16-segment extended-length (112 bit) messages. This exceeds the requirement for four-segment messages for "COMM C" and "COMM D" capability. The multiple 16-segment COMM D message capability envisioned for ICAO Level 5 will be easily handled by the XS-950 S/I as it has been designed to meet the RF duty cycle requirements for ICAO Level 5 and is software upgradeable when the message content of ICAO Level 5 is defined.

Software in the transponder is completed and certified to DO-178B, the FAA requirement for software development and certification. Software updates can be completed on-board the aircraft by means of an ARINC 615 portable data loader. The data loader port is located on the front connector.

This XS-950 S/I Transponder can accommodate the Future Air Navigation System (FANS) and Aeronautical Telecommunications Network (ATN) data link functions currently being developed. These functions included the Airborne Data Link Processor (ADLP), Differential GPS (DGPS) data link and the proposed ICAO Mode S data link Level 5.

The Mode S ADLP, which is accommodated within the Honeywell XS-950 Transponder, permits the transponder to connect directly to the ARINC 758 Communications Management Unit (CMU) via an ARINC 429 data bus. This function is described in Radio Technical Commission for Aeronautics (RTCA) DO-218. No additional ADLP line replaceable unit is necessary with this capability in the transponder. The transponder is hardware-provisioned for the ADLP and is planned to be upgraded through a software change.

Data link support for DGPS is also provided in the transponder design. As the DGPS correction format and path are developed, the transponder software can be modified to receive corrections from ground equipment. The transponder can send the corrections to an ARINC 734/743A GPS/GNSS receiver system via a dedicated ARINC 429 data bus.

Data link "Level 5" has been proposed at ICAO to further enhance the usefulness of Mode S as a data link. Level 5 allows coordinated simultaneous communications with multiple ground stations. This change is accommodated within the transponder and would be accomplished through a software change.

The Honeywell AT-910 antenna is mechanically simple, with only three primary components using a proven Amplitude Monopulse Sensing scheme in the directional antenna. This antenna has the lowest profile (0.78 inch) of any TCAS II antenna currently available on the market. The received signal amplitude in each antenna sensing element is proportional to the relative bearing. This antenna scheme evolved from a proven Dalmo Victor design for critical military airborne applications, optimized over several years of extensive flight testing. The AT-910 transmits in four selectable directions while receiving omni-directionally with bearing.

The TCAS directional antenna is a four-element, vertically-polarized, monopole array capable of transmitting four selectable directions at 1030 MHz. The antenna is capable of receiving replies from all directions simultaneously with bearing information at 1090 MHz, using amplitude-ratio monopulse techniques.

The antenna consists of molded radome with radiating/receiving elements and is completely filled with a rigid foam. The antenna assembly uses five or nine screws to attach the radome and either four or eight screws to attach the antenna to the aircraft fuselage.

The Honeywell directional antenna has a small frontal area. The circular radome has a 3:1 elliptical leading edge and an extremely low profile height of only 0.806 inch. This yields excellent aerodynamic performance with a minimum possibility of icing which could be a hazard for rear mounted engines.

In extensive flight testing, Honeywell's four-element azimuth sensing system has demonstrated an ability to detect and provide timely advisories on targets both above and below, using a single top-mounted directional and bottom-mounted omni-directional antenna. The MCAS system is also capable of accommodating dual directional antennas for increases bearing accuracy of some targets.

The aircraft can either have stand-alone GPS or embedded GPS capability to support extended Mode-S and tactical data link.

The ADS-B messages referenced herein are comprised of five "extended length" squitter messages: (1) Extended squitter airborne position; (2) Extended squitter airborne velocity; (3) Extended squitter surface position; (4) Extended squitter aircraft identification; and (5) Event-driven squitter. Additional information regarding these ADS-B messages can be found in AEEC (Airlines Electronic Engineering Committee) ARINC (Aeronautical Radio, Inc.), Circulation of Draft 2 of Project Paper 718A, "MARK 4 AIR TRAFFIC CONTROL TRANSPONDER (ATCRBS/MODE-S)," Sep. 12, 1997.

A modified or augmented TCAS-2000 is a preferable TCAS (being that it is a recent product) but other TCAS systems can be adapted and used as well in a manner well known to those skilled in the art. The TCAS-2000 is a Traffic Alert and Collision Avoidance System that is available from Honeywell, the company that also developed the TCAS II. Standard (i.e., before modification as described herein) TCAS 2000 features include: increased display range to 80 nautical miles (nm) to meet Communication, Navigation, Surveillance/Air Traffic Management (CNS/ATM) requirements; variable display ranges (5, 10, 20, 40 and 80 nm); 50 aircraft tracks (24 within five nm); 1200 knots closing speed; 10,000 feet per minute vertical rate; normal escape maneuvers; enhanced escape maneuvers; escape maneuver coordination; and air/ground data link.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. For example, the antenna mounting technique taught in U.S. Pat. No. 5,805,111 could be implemented in the present invention to extend TCAS detection range. Further, the present invention further comprises a digital terrain elevation database that allows the TCAS to generate a vertical terrain profile, which results in a survivable control and guidance system. It is contemplated that the use of the present invention can involve components having different characteristics as long as the principle, the presentation of a TCAS with a tactical based module, is followed. The present invention applies to almost any CAS system and is not limited to use by TCAS. Additionally, although the present invention has been described with respect to aircraft operating a military tactical environment, it has application to aircraft operating in a civilian/commercial air space. It is intended that the scope of the present invention be defined by the claims appended hereto.

The embodiments of an invention in which an exclusive property or right is claimed are defined as follows:

1. A traffic alert and collision avoidance system, the system comprising:

data link transponder means, said transponder means generating and transmitting broadcast data, the broadcast data comprising aircraft position information of a host vehicle; and traffic alert and collision avoidance system (TCAS) computer means, in communication with said transponder means, for receiving and processing broadcast data from said data link transponder means, the TCAS comprising:

air traffic management (ATM) means for monitoring and tracking objects external to the host vehicle; and tactical-based management means, in communication with ATM means, for monitoring and tracking tactical objects external to the host vehicle.

2. The system of claim 1, further comprising airborne radar that receives signals transmitted from external communication sources.

3. The system of claim 1, further comprising datalink means in communication with said TCAS for communicating with external communication sources.

4. The system of claim 1, further comprising station keeping equipment that determines range and bearing of the external communication sources and allows the host vehicle to resolve position with respect to other objects.

5. The system of claim 1, further comprising navigation units to obtain navigational information and data in a universal time reference frame.

6. The system of claim 1, further comprising an integrated communication system to generate audio signals representing advisory notices to the operator of the host aircraft.

7. The system of claim 1, further comprising display driver means in terms of serial bus, high speed data bus, video analog signals, night vision imaging system, heads-up display system, and multifunctional display system.

8. The system of claim 1, further comprising flight guidance control means for mode information to said TCAS and for receiving flight control commands for controlling the host vehicle.

9. The system of claim 1, further comprising means for interfacing with a directional antenna and an omnidirectional antenna.

10. The system of claim 1, further comprising a digital terrain elevation database for allowing the system to generate a vertical terrain profile.

11. The system of claim 1, wherein the Tactical management means calculates formation commands to provide to the control laws of the navigation means and/or to allow the vehicle operator to assess the fidelity of the flight formation.

12. The system of claim 1, wherein the Tactical management means comprises:

MCAS mode logic; tactical communication protocol; tactical communication user interfaces; track file correlation; blending sensor data; tactical resolution advisory means; tactical traffic advisory means; formation flight handling means; rendezvous handling means; air refueling handling means; and radio frequency power and transmission schedule management means.

13. The system of claim 12, wherein the formation flight handling means provides logic handling capability to set the conditions for break-away-from-formation flight.

14. The system of claim 12, wherein the tactical traffic advisory means generates the guidance and situational awareness display commands following break-away-from-formation flight for advising the operator of the host vehicle.

15. The system of claim 1, wherein the system is capable of operating in a minimum operating capacity.

16. The system of claim 12, wherein the radio frequency power and transmission schedule management means is capable of modulating the power level based on operating environment and scheduling management to allow the tactical datalink to transmit, receive, and re-transmit data.

17. The system of claim 3, wherein the datalink system is capable of serving as a complimentary/backup system for the transponder means in the event the transponder means fails or operates less than optimally.

* * * * *